United States Patent [19]

Webb et al.

[11] Patent Number: 4,972,464
[45] Date of Patent: Nov. 20, 1990

[54] SYSTEM FOR PLACEMENT OF A LONG DISTANCE TELEPHONE CARRIER POINT-OF-PRESENCE AND CALL ROUTING

[75] Inventors: Arthur F. Webb; M. Kashefipour, both of Overland Park, Kans.

[73] Assignee: U.S. Sprint Communications Company Limited, Kansas City, Mo.

[21] Appl. No.: 430,487

[22] Filed: Nov. 1, 1989

[51] Int. Cl.$^5$ .......................................... H04M 15/32
[52] U.S. Cl. .................................................... 379/112
[58] Field of Search .................... 379/112, 111, 115

[56] References Cited

U.S. PATENT DOCUMENTS 4,756,019  7/1988  Szybicki ............................. 379/112

*Primary Examiner*—Stafford D. Schreyer
*Attorney, Agent, or Firm*—Hovey, Williams, Timmons & Collins

[57] ABSTRACT

A system is disclosed for determining the transport costs of long distance traffic to a long distance carrier having a point-of-presence in a local access and transport area (LATA) by the addition of one or more points-of-presence to the area, and for determining the lowest cost routing of long distance traffic through a carrier's points-of-presence in a LATA.

17 Claims, 2 Drawing Sheets

SYSTEM FOR PLACEMENT OF A LONG DISTANCE TELEPHONE CARRIER POINT-OF-PRESENCE AND CALL ROUTING

BACKGROUND OF THE INVENTION

1. Field of the Invention

The present invention concerns a system for determining comparative transport costs of long distance traffic to a long distance carrier having a point-of-presence in a local access and transport area by the addition of more point-of-presence, ant for determining the least cost routing of the long distance traffic through existing or candidate points-of-presence.

2. Description of the Prior Art

Local exchange carriers provide local telephone service within a geographical area which typically includes a so-called Local Access Transport Area (LATA). Long distance telephone service between LATA's is provided by long distance telephone companies also known as interexchange carriers. In order to provide long distance service, an interexchange carrier must have a so-called point-of-presence (POP) within each LATA in order to receive long distance traffic originating within the LATA from the local exchange carrier, and to transfer long distance traffic terminating within the LATA to the local exchange carrier.

A typical LATA includes a number of so-called end offices or local telephone exchanges to which individual telephones are directly connected. Telephone traffic between end offices is usually routed by way of a tandem switch which avoids the need for each end office to be directly connected to every other end office within the LATA. Instead, the tandem switch routes the telephone traffic, either originating or terminating, between end offices, between an end office and another tandem, or between an end office and the POP of an interexchange carrier.

In order to place a POP in a LATA, an interexchange carrier connects to an end office of the carrier's choice within the LATA. In this regard, the end office serves merely as a service wire center for the physical connections for placing the POP in circuit communication with the tandem switch by which long distance traffic is routed to and from the carrier's POP. A long distance call terminating within the LATA is transferred from the interexchange carrier's network to the tandem of the local telephone company by way of the carrier's POP. The tandem then routes the call to the end office to which the called customer is connected. Similarly, a customer's long distance call is routed from the customer's end office to the tandem switch which then transfers the call to the POP belonging to the interexchange carrier which the customer has designated for providing long distance service.

In return for providing these switching services, the local exchange carrier charges transport fees which are known as transport costs to the interexchange carrier. These transport costs are often in the form of a per minute charge based on the chargable distance or mileage between the customer's end office and the end office to which the carrier's POP is connected, for example. Thus, the farther the customer's end office is from the end office to which carrier's POP is connected, the higher the transport costs on a per minute basis.

The transport tariffs of the local exchange carriers vary considerably. For example, some tariffs are based on a straight mileage distance between end offices and some are on the basis of a banded mileage scheme.

So called meet-point tariffs are also involved if more than one local telephone company is operating within a given LATA. For example, the interexchange carrier may have its POP connected to one local telephone company and the customer may be served by the other. In this situation, the call is transferred from one local telephone company to the other and the applicable tariffs for each local telephone company must be taken into account to the "meet-point."

Determining transport costs is also complicated by the fact that some end offices are directly trunked to the carriers's POP thereby bypassing the tandem switch. Additionally a different tariff may apply for intrastate traffic between LATA's.

It maybe advantageous for a interexchange carrier to provide additional POP's within a LATA in order to minimize chargable distances and thereby minimize transport charges. In a densely populated LATA, however, literally hundreds of end offices may be present and determining the most economical location for one or more additional POP's can be difficult. In the prior art, this has been done be determining the weighted average transport cost based on actual mileage between end offices taking into account the volume of long distance traffic. This method may not be optimal, however, because of the complicated tariff structure. For example, the most economical transport cost may not necessarily result from the shortest mileage distance because of banded mileage charges and meet-point tariffs.

Furthermore, a method based strictly on distance between end offices does not necessarily provide the most economical routing when more than one POP is already present within the LATA. For example, if more than one POP is present in a LATA, the interexchange carrier can route traffic terminating within the LATA through the POP of choice. For calls originating within the LATA, however, a tandem through which the calls passes may be programmed to route all originating calls to only one POP. Hence, the most economical routing for originating traffic may be different than that for traffic terminating within the LATA.

SUMMARY OF THE INVENTION

The present invention solves the prior art problems outlined above. That is to say, the system hereof takes into account all the relevent tariffs, LATA architecture, and directionality and volume of long distance traffic in determining the transport costs of one or more additional POP's, and in determining the most economical routing for long distance traffic through multiple POP's.

Broadly speaking, the preferred system concerns a method of an operating computer having data memory by first providing the memory with configuration data representative of the LATA architecture including the end offices, all of the relative transport rates and chargable distances between respective end offices, and long distance traffic, actual or projected, through the respective exchanges. The preferred method further includes the steps of providing the memory with candidate data representative of a set of at least one selected candidate POP for inclusion in the LATA, and determining in the computer the total transport costs for the long distance traffic according to which of the existing and candidate POP's present the lowest transport costs in accordance with the transport rates and charges.

In preferred forms, the method hereof separately determines the total transport costs for terminating and originating long distance traffic. That is to say, transport rates for originating traffic may be determined on the basis of routing all originating traffic through only one of the available POP's, while transport costs for terminating traffic are determined on the basis of assigning each end office to the available POP which presents the lowest transport cost.

Other important aspects of the present invention are discussed further hereinbelow.

BRIEF DESCRIPTION OF THE DRAWING FIGURES

DETAILED DESCRIPTION OF THE PREFERRED EMBODIMENT

Figure 1:
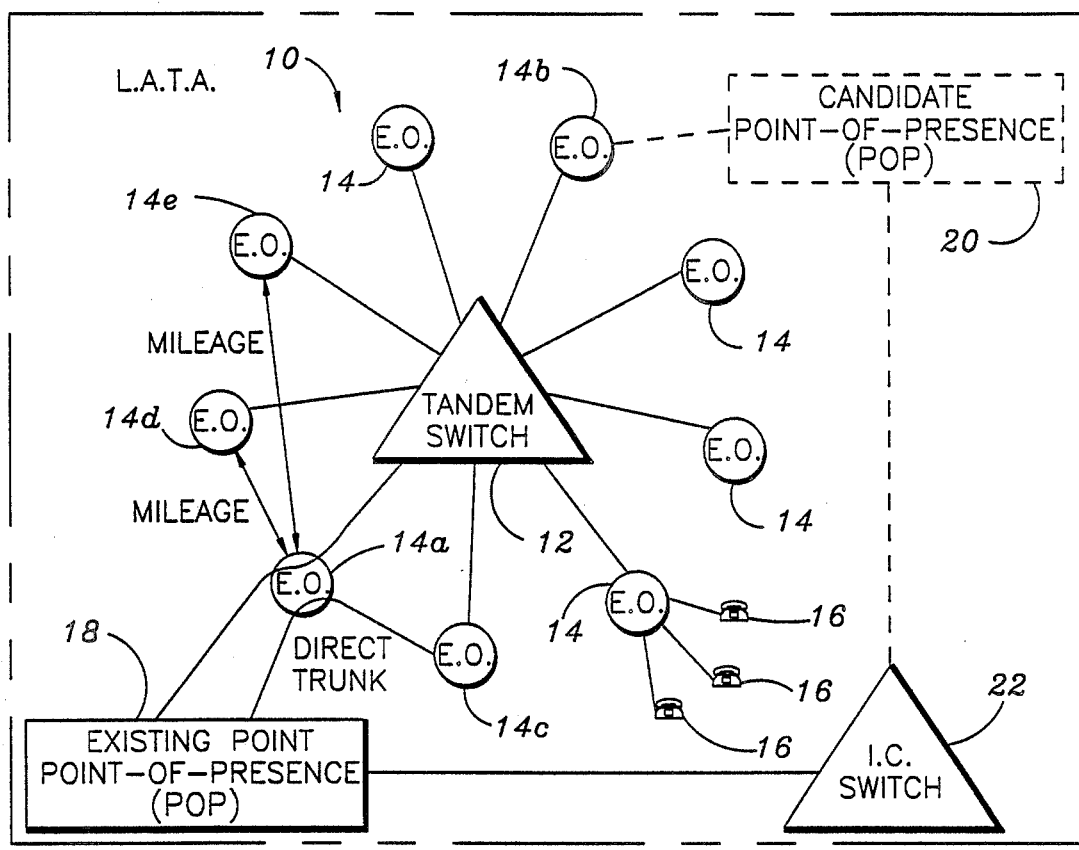
FIG. 1 is a schematic representation of a local access and transport area LATA) illustrating an existing point-of-presence for an interexchange carrier and, in dashed lines, a candidate point-of-presence.

FIG. 1 is a schematic illustration of a so-called local access and transport area (LATA) 10 which presents the preferred environment of use of the present invention. LATA 10 includes tandem switch 12 which routes telephone calls between end offices 14. Each end office 14 serves as the local exchange and wire center for a plurality of customer telephones 16. As those skilled in the art appreciate, each end office may actually include more than one local exchange depending upon local customer density and physical convenience.

Typically, the local telephone company, also known as the local exchange carrier, provides telephone service within the LATA and interexchange carriers provide long distance telephone service between LATA's. In some areas more than one local exchange carrier may operate within a given LATA. A given local exchange carrier may also provide local telephone service in more than one LATA, although most local exchange carriers are prohibited from providing inter-LATA telephone service. An interexchange carrier, however, may provide intra-LATA telephone service in some areas.

FIG. 1 illustrates an existing point-of-presence (POP) 18 provided by a interexchange carrier within LATA 10. End office 14a serves as the connection point or so-called service wire center for POP 18 so that long distance traffic can be routed between POP 18 and tandem switch 12. FIG. 1 also illustrates candidate POP 20 in dashed lines associated with end office 14b for connection with tandem switch 12. Interexchange carrier switch 22, which is one of a plurality of switches included in the interexchange carrier's network, connects with POP 18 and also includes a candidate connection to candidate POP 20. While FIG. 1 illustrates switch 22 included within the boundaries of LATA 10, such may not always be the case in that a given interexchange carrier switch may serve more than one LATA and may not be physically located within the boundaries thereof. End office 14c is connected with direct truck lines to POP 18 routed by way of end office 14a serving as a connection point or wire center.

In operation, a long distance call being carried by the interexchange carrier network and destined for LATA 10, is routed from the originating LATA by way of interexchange carrier switch 22, existing POP 18, tandem switch 12, to end office 14d, for example, and then to the customer's telephone connected thereto. With such a call, the transport rate is, in part, based upon the chargable distance, that is the mileage, between end office 14a which is a connection point for existing POP 18 and end office 14d. It should be noted that the transport cost is not based upon the mileage to and from tandem switch 12, but rather is only based upon the distance between the respective end offices. Thus, if a long distance call were to terminate at a customer's telephone connected to end office 14e, the chargable distance is greater between end offices 14a and c and the transport cost may also be greater depending upon the applicable tariffs.

As discussed above, the transport rate may be based on a banded mileage rate. For example, one rate may apply for distances up to one mile, another rate for distances between one and five miles, another rate between five and fifteen miles, and so forth. If end offices 14c and d are both within the same mileage band, for example, then the transport rate would be the same even though they are different distances from end office 14a.

As a further example of the application of transport rates, 14b may be served by a local telephone company different from the one which serves end office 14a. In such a case, the transport rate may further include a so-called "meet-point" billing which represents that portion of the transport charge billed as a percentage by the respective local telephone companies.

If a second or additional point-of-presence such as candidate POP 20 is included in the LATA, interexchange carrier switch 22 can be configured to route long distance traffic terminating within LATA 10 by way of either POP 18 or 20. However, for traffic originating within LATA 10, tandem switch 12 is typically programmed to route all of the originating long distance traffic to only one of POP's 18 or 20. One exception concerns calls originating at an end office 14c which includes a direct trunk connection to POP 18. Another exception occurs in some areas in which the tandem switch is "sectorized" for routing originating traffic to more than one POP.

Figure 3:
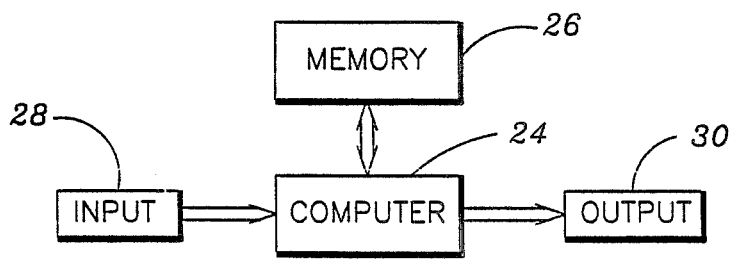
FIG. 3 is a schematic representative of a computer for implementing the program of FIG. 2.
Figure 2:
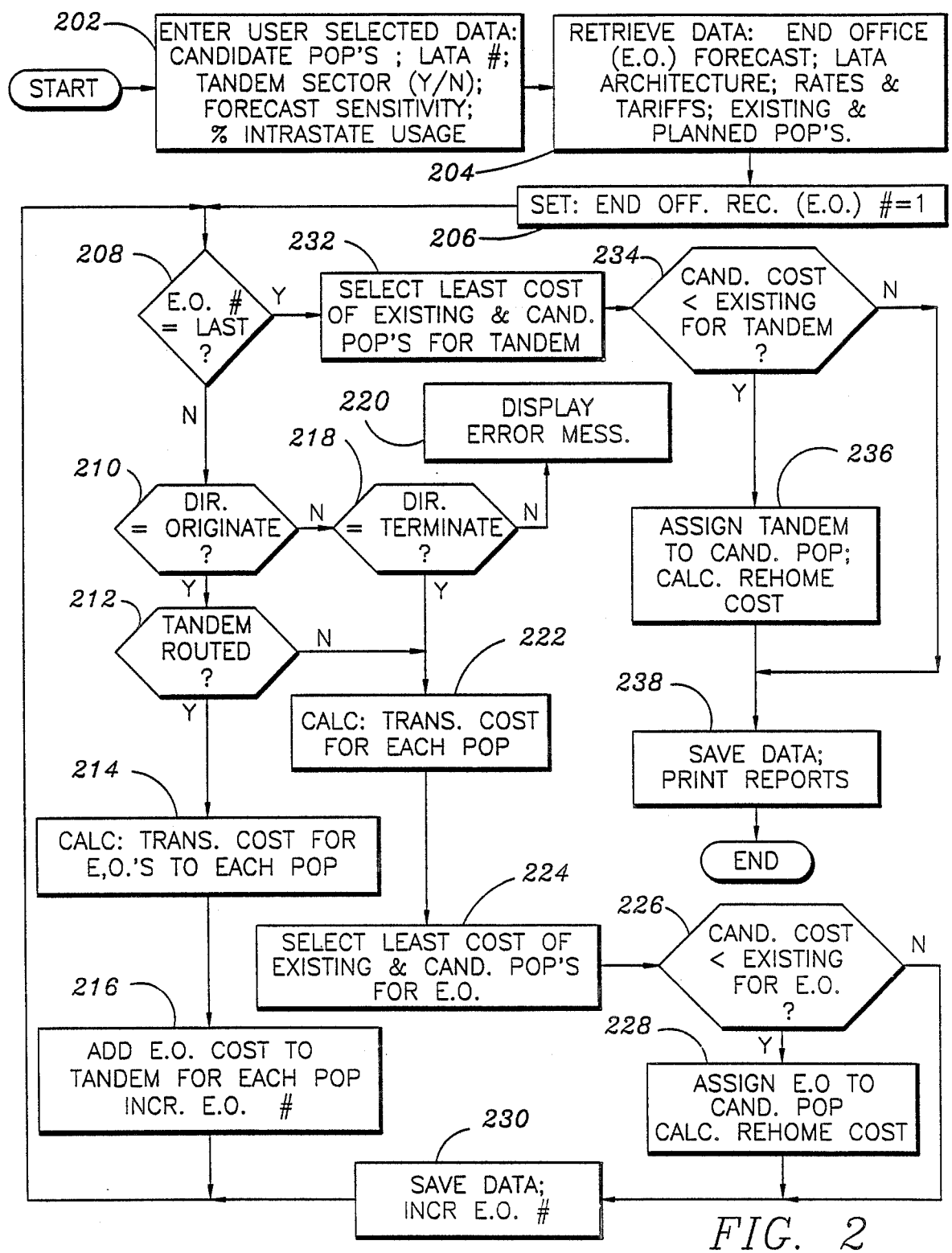
FIG. 2 is a computer program flow chart of a computer program as the preferred method for operating a computer in accordance with the present invention.

FIG. 2 is a computer program flow chart illustrating the preferred program for operating computer 24 schematically illustrated in FIG. 3. Computer 24 is preferably a Digital brand Vax model mini-computer having memory unit 26 in form of a conventional hard drive, input device 28 which can take the form of a conventional keyboard or data transfer bus from another computer, an output device 30 in the form of a CRT screen and also a printer. As explained further hereinbelow, data is provided to memory 26 representative of the LATA architecture including end offices, transport rates and chargable distances, that is, mileage therebetween and the long distance traffic including current and projected. Memory 26 is also provided with data representative of one or more candidate points-of-presence. Input 28 is the preferred means for providing this data to memory 26. Computer 24 is also the preferred means for determining the transport costs for the candidate arrangement and the routing for long distance calls when more than on POP is present in the LATA.

Turning now to FIG. 2, the preferred method as embodied in the program stored also in memory 26 enters at step 202 in which memory 26 is provided with user selected data. This data includes the LATA number which is the number of the LATA to be analyzed from among all the LATA locations stored in memory. In step 202, the user also enters one or more candidate points-of-presence by identifying the end office or other wire center to which it is to be connected. In the preferred embodiment, up to twenty candidate POP's can be entered at a time for analysis.

In step 202, the user also enters whether the tandem switch subtending a respective POP is configured into so-called "sectors". In some LATA's, the tandem can be programmed to route originating long distance calls to more than one POP is requested by the interexchange carrier. If such sectorizing is available, then all of the originating long distance calls need not be routed to only one POP, but can be routed up to the maximum number of POP's corresponding to the maximum number of sectors which the tandem has been programmed to handle.

Forecast sensitivity, which is also entered in step 202, is a user indication of a confidence level of the forecasted or projected long distance traffic. This entry in step 202 allows the user to enter a multiplication factor for the projected forecast to develop a so-called "what if" scenario if the actual long distance usage were to be greater or smaller than that projected.

Step 202 also allows the user to enter a number representative of the percentage of intrastate usage includes the long distance traffic. That is to say, a given state may include more than one LATA and long distance traffic routed between LATA's within one state are subject to a separate set of tariffs than interstate traffic. The program illustrated in FIG. 2 applies the intrastate tariffs to the percentage of the forecasted long distance traffic entered in step 202.

The program then moves to step 204 which retrieves data representative of the projected long distance traffic for each end office in the selected LATA. This data includes the directionality of the projected long distance traffic—originating or terminating. The LATA architecture also includes data representative of which end offices have direct trunk lines available. Step 204 also retrieves the LATA architecture including all of the tandex switches, end offices, and chargable distances therebetween. Additionally, step 204 retrieves from memory 26 all of the relevant transport rates. As discussed above, this can include mileage rates, banded mileage rates, intrastate tariffs, and so forth. Finally, step 204 retrieves data representation of the existing and planned POP's. Preferably the user has the option of treating a planned POP as either existing or as a candidate POP.

The program then moves to step to 206 which sets the variable "end office record number" equal to one. As explained further hereinbelow, analysis is conducted for each end office record starting with the first. Step 206 sets this variable for the first end office record in the selected LATA. A separate "record" is provided for each end office access type. For example, the originating traffic for a given end office is one record and the terminating traffic for that end office is a separately numbered record.

The program then moves to step 208 in which asks whether the end office number is the last to be analyzed. Initially the answer in step 208 is no and the program moves to step 210 which asks whether the long distance traffic retrieved for the end office is originating within the LATA.

If the answer in step 210 is yes, the program moves to step 212 which asks whether the long distance traffic associated with the end office under consideration is routed by way of the tandem switch. If yes, which is the typical case, the program moves to step 214 which calculates the transport cost for the originating traffic for each existing (including planned, if so opted) and candidate POP.

The program then moves to step 216 which adds the transport cost for the originating traffic for the end office being considered to the tandem cost for each of the existing and candidate POP's. Step 216 also increments the end office record number. The program then loops back to step 208.

Returning to step 210, if the answer is no, the program moves to step 218 which asks whether the long distance traffic associated with the end office being analyzed is terminating traffic. If no, the program moves to step 220 to display an error message. That is to say, if the traffic is not originating, then it must be terminating, and a negative answer to both questions indicates an error in the data.

Normally, however, the answer in step 218 is yes and the program moves to step 222. This step is also executed if the answer in step 212 is no. That is to say, if the originating traffic is not tandem routed, then it is direct trunked. In such circumstances, the interexchange carrier has the option of connecting the direct trunks to the candidates POP's or leaving the connections to the existing POP. In other words, if the end office is direct trunked, then the originating traffic can be treated in the same way as terminating traffic because the originating traffic does not go through the tandem switch and is not routed thereby.

Step 222 determines the transport costs for each existing and candidate POP as a function of the respective tariffs and mileages.

The program then moves to step 224 which selects the least transport cost of those calculated in 222.

The program then moves to step 226 which asks whether the least cost selected in step 224 is less than the existing cost for that end office. For example, if twenty candidate POP's are being considered, step 224 picks the least transport cost for the end office being considered from among the candidate and existing POP's. Step 226 then asks whether the least cost selected in step 224 is less than the existing transport cost.

If the answer in step 226 is yes, then the program moves to step 228 to assign the end office under consideration to that candidate POP. In other words, the end office record under analysis is identified or associated with the candidate POP providing it with the lowest transport costs. Step 28 also calculates the "rehoming" costs or charges for changing the end office routing and relocating the trunk lines, if applicable.

If the answer in step 226 is no, indicating that the candidate cost is equal to or greater than the existing transport costs for that end office, the program bypasses step 228. This ensures that a "rehoming" or routing change is not indicated for a break even situation.

After step 228, or if the answer in step 226 is no, the program moves to step 230 to save the calculated data and to increment the end office record number in order to execute the program steps for the next end office record. The program continues to loop through steps 208-230 until the last end office record in the LATA has been analyzed at which point the program moves to step 232 which is a step concerned with originating long distance traffic. Step 232 selects the least cost of the existing and candidate POP's for the originating traffic which is tandem routed. The calculation in step 214 determines the transport costs for originating traffic of all of the end offices which are tandem routed through each of the existing and candidate POP's. Step 232 then selects the least cost POP. for originating long distance traffic.

The program then moves to step 234 which asks whether the least cost selected in step 232 is less than the existing transport cost for originating traffic on a tandem by tandem basis. That is to say, if the LATA architecture indicates that more than one tandem is present in the LATA, then the least cost routing for the originating long distance traffic is selected for each tandem.

If the answer in step 234 is yes, indicating that the lowest transport cost for originating long distance traffic is achieved through one of the candidate POP's, the program moves to step 236 which assigns the tandem to that least cost candidate POP for the originating traffic, and calculates the "rehoming" cost which is the cost for changing the tandem routing from the existing to the selected candidate POP.

If the answer in step 234 is no, indicating that none of the candidate POP's provide a lower cost routing for the originating long distance traffic, step 236 is bypassed.

The program then moves to step 238 which saves the newly calculated data and prints appropriate reports by way of computer output device 30. The preferred reports indicate, among other items, existing transport costs, transport costs for each candidate POP, the total transport costs, selected candidate and routing of the LATA configuration presenting the lowest cost. The preferred reports also indicate the circuit rehoming costs.

As those skilled in the art will appreciate, the program can be repetitively executed for a candidate POP at each end office in the LATA in order to determine the placement of a candidate POP presenting the lowest total transport costs. Furthermore, the program can be repetitively executed for combinations of sets of two or more candidate POP's at a time. In other words, finding the lowest costs for successive additions of a set of on candidate POP may not produce the lowest cost scenario for adding candidate POP's two or more at a time. With the method hereof, combinations of and number of candidate POP's with respective end offices in the LATA can be analyzed to determine the best possible scenerio for minimizing transport costs within the LATA. The system hereof is also useful for lowest cost routing of long distance traffic through two or more existing POP's. This can be achieved for example by treating all but one of the existing POP's as candidate in the program which assigns the end offices to the lowest cost POP for routing for the traffic.

Having thus described the preferred embodiment of the present invention, the following is claimed as new and desired to be secured by Letters Patent:

1. A method of operating a computer for determining the transport costs to a long distance interexchange carrier by the addition of at least one point-of-presence in an area such as a local access and transport area having a plurality of telephone exchanges such as end offices and having at least one existing point-of-presence for the carrier, the computer including memory means, said method comprising steps of:
    (a) providing the computer memory means with configuration data representative of the area including the exchanges, transport rates and chargeable distances between the respective exchanges, long distance traffic through the exchanges, and said at least one existing point-of-presence;
    (b) providing the computer memory means with candidate data representative of a set of at least one candidate point-of-presence; and
    (c) determining in the computer the total transport costs for said long distance traffic according to which said existing and candidate points-of-presence present the lowest transport cost for said long distance traffic respectively for each exchange in accordance with said transport rates and chargeable distances.

2. The method is set forth in claim 1, further including the steps of repeating steps (b) and (c) for a plurality of said sets.

3. The method is set forth in claim 2, further including the step of selecting which of said sets presents the lowest total transport costs.

4. The method is set forth in claim 1, further including the step of assigning each exchange to that point-of-presence from among said existing and candidate points-of-presence which presents the lowest transport costs to the carrier for said long distance traffic.

5. The method is set forth in claim 1, futher including the steps of providing the computer memory means with traffic data representative of said long distance traffic as originating or terminating traffic within the local access and transport area, and separately determining said transport costs for said originating and terminating traffic.

6. The method is set forth in claim 5, further including the step of determining originating costs for said originating traffic in accordance with all of said originating traffic being routed through only one of the existing and candidate points-of-presence.

7. The method is set forth in claim 6, further including the steps of:
    providing the computer memory means with direct trunk data representative of certain ones of the exchanges having direct trunk lines, and
    determining said originating costs for said long distance originating traffic of the exchanges having said direct trunk connections separately from the remaining originating traffic.

8. The method is set forth in claim 1, said transport rates including direct mileage rates, banded rates, meet-point tariffs, and intrastate usage and associated rates.

9. The method is set forth in claim 1, said long distance traffic including projected long distance traffic.

10. A method of routing long distance traffic of an interexchange carrier through a plurality of points-of-presence in an area such as a local access and transport area having a plurality of telephone exchanges such as end offices and the like through which long distance traffic is routed, the computer including memory means, said method comprising steps of:
    (a) providing the computer memory means with configuration data representative of the area including the exchanges, transport rates and chargeable distances between respective exchanges, long distance traffic through the respective exchanges, and the points-of-presence;

(b) determining in the computer which of said points-of-presence present the lowest transport costs for said long distance traffic respectively for each exchange in accordance with said transport rates and chargeable distances; and (c) routing said long distance traffic between each exchange and one of said points-of-presence in accordance with said respective lowest transport costs.

11. The method as set forth in claim 10, said transport rates including direct mileage rates, banded rates, meet-point tariffs, and intrastate useage and associated rates.

12. In the method as set forth in claim 10, said long distance traffic including projected long distance traffic.

13. An apparatus for determining the transport costs to a long distance interexchange carrier by the addition of at least one point-of-presence in an area such as a local access and transport area having a plurality of telephone exchanges such as end offices or the like and having at least one existing point-of-presence for the carrier, said apparatus comprising:

(a) means storing configuration data representative of the area including the exchanges, transport rates and chargeable distances between respective exchanges, long distance traffic through the respective exchanges, and at least one existing point-of-presence in the area;

(b) means storing candidate data representative of a set of at least one candidate point-of-presence for the area;

(c) determining means operably coupled with said configuration and candidate storing means for selectively retrieving said data and responsive thereto for determining the total transport costs of said long distance traffic according to which of said existing and candidate points-of-presence present the lowest transport costs for said long distance traffic respectively for each exchange in accordance with said transport rates and chargeable distances.

14. The apparatus as set forth in claim 13, said configuration and candidate data storing means including magnetic memory storage media.

15. The apparatus as set forth in claim 13, said determining means including a computer.

16. The apparatus as set forth in claim 13, said transport rates including direct mileage rates, banded rates, meet-point tariffs and intrastate usage and associated rates.

17. The apparatus as set forth in claim 13, said long distance traffic including projected long distance traffic.

* * * * *